United States Patent
Wookey

(10) Patent No.: US 8,402,126 B2
(45) Date of Patent: *Mar. 19, 2013

(54) METHOD AND SYSTEM FOR DISCOVERING MANAGED SYSTEMS IN A NETWORK

(75) Inventor: Michael J. Wookey, Los Gatos, CA (US)

(73) Assignee: Oracle America, Inc., Redwood City, CA (US)

(*) Notice: Subject to any disclaimer, the term of this patent is extended or adjusted under 35 U.S.C. 154(b) by 102 days.

This patent is subject to a terminal disclaimer.

(21) Appl. No.: 12/827,855

(22) Filed: Jun. 30, 2010

(65) Prior Publication Data

US 2010/0268811 A1    Oct. 21, 2010

Related U.S. Application Data

(63) Continuation of application No. 12/164,420, filed on Jun. 30, 2008, now Pat. No. 7,877,477.

(51) Int. Cl.
*G06F 15/173* (2006.01)

(52) U.S. Cl. .......... 709/223; 709/224; 709/225
(58) Field of Classification Search .......... None
See application file for complete search history.

(56) References Cited

U.S. PATENT DOCUMENTS

| | | | | |
|---|---|---|---|---|
| 6,978,314 B2 * | 12/2005 | Tarr | ............ | 709/245 |
| 2007/0088814 A1 * | 4/2007 | Torii | ............ | 709/223 |

* cited by examiner

*Primary Examiner* — Krista Zele
*Assistant Examiner* — Azizul Choudhury
(74) *Attorney, Agent, or Firm* — Osha • Liang LLP

(57) ABSTRACT

A method for discovering managed systems in a network including classifying a first managed system associated with a first active Internet Protocol (IP) address in the network using a plurality of network protocols, identifying a set of drivers using the classification, where the set of drivers are configured to obtain first management information about the managed system, obtaining a first set of drivers, populating a data model with the first management information obtain using at least one of the first set of drivers, and managing the first managed system using the data model.

9 Claims, 11 Drawing Sheets

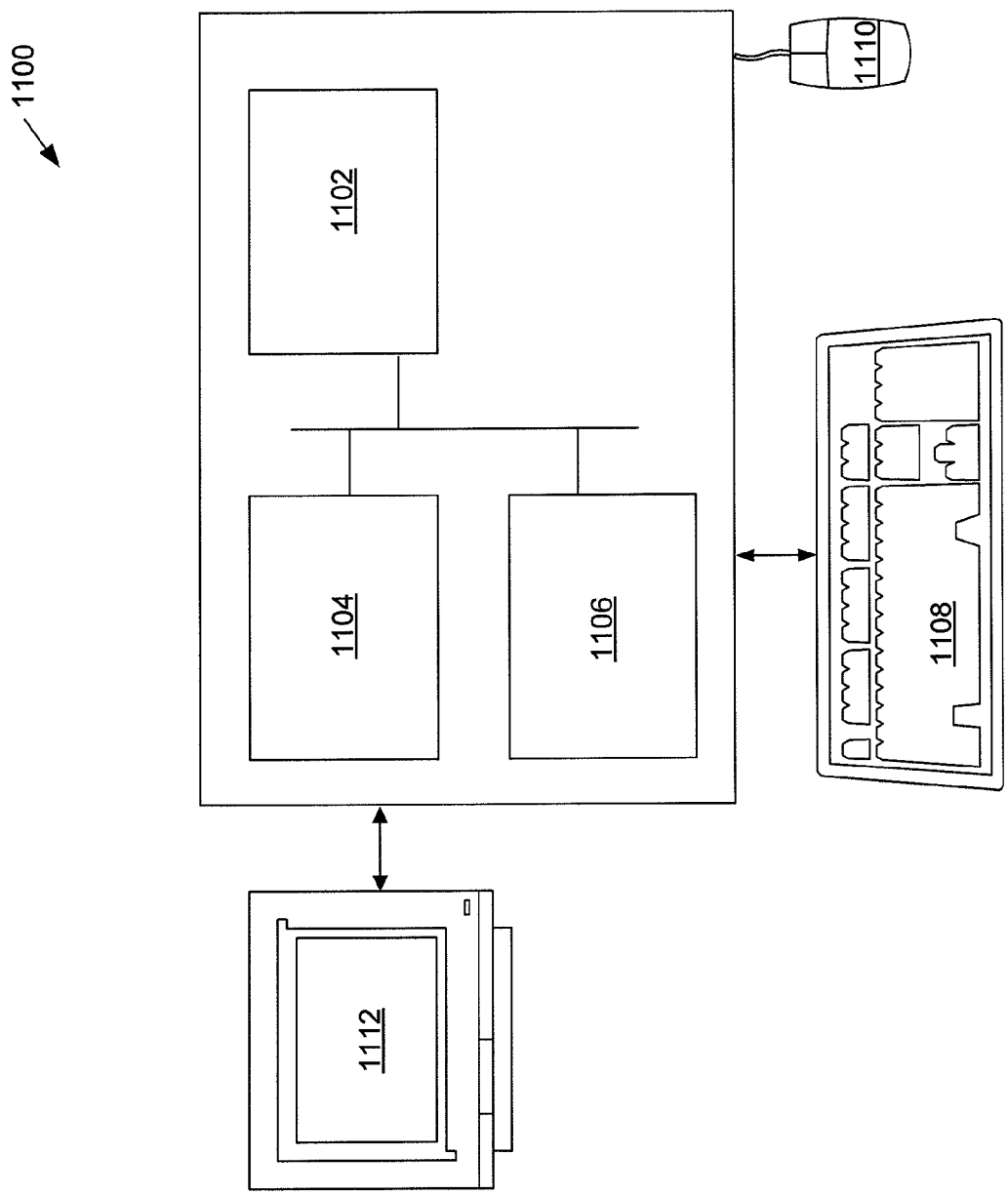

METHOD AND SYSTEM FOR DISCOVERING MANAGED SYSTEMS IN A NETWORK

CROSS-REFERRENCE TO RELATED APPLICATIONS

This application is a continuation of U.S. patent application Ser. No. 12/164,420, entitled: "METHOD AND SYSTEM FOR DISCOVERING MANAGED SYSTEMS IN A NETWORK", and filed on Jun. 30, 2008 now U.S. Pat. No. 7,877,477. Further, this application claims benefit from U.S. patent application Ser. No. 12/164,420 under 35 U.S.C. §120, which is hereby incorporated by reference in its entirety.

BACKGROUND

A datacenter is a facility that physically houses various equipment, such as computers, servers (e.g., web servers, application servers, database servers), switches routers, data storage devices, load balancers, wire cages or closets, vaults, racks, and related equipment for the purpose of storing, managing, processing, and exchanging data and information between nodes. A node is typically either a client or a server within the data center. Datacenters also provide application services and management for various data processing functions.

Datacenters are a unique environment because all the computers and services provided to clients are within a controlled and well-monitored environment. Additionally, datacenters are not static. In other words, datacenters are constantly growing to add additional computers, services, and/or support more users. Therefore, scaling datacenters to increase performance due to the growth of services and users is an ongoing effort.

Due to the dynamic nature of data centers technological solutions have been developed to aid in the management of datacenters. One common approach is to tier management services and locate them in specific locations in the deployment network topology (i.e., a static locations within the datacenter). However, as the network topology within the datacenter changes, for example, the data center is divided into two subnets necessitating the addition of additional routers, the management service must be re-configured and, in some cases, re-deployed, to function in the new topology.

SUMMARY

In general, in one aspect, the invention relates to a method for discovering managed systems in a network. The method comprises classifying a first managed system associated with a first active Internet Protocol (IP) address in the network using a plurality of network protocols, identifying a set of drivers using the classification, wherein the set of drivers are configured to obtain first management information about the managed system, obtaining a first set of drivers, populating a data model with the first management information obtain using at least one of the first set of drivers, and managing the first managed system using the data model.

In general, in one aspect, the invention relates to a first managed system executing in a network, wherein the first managed system comprises a first hardware component and a first software component. The first managed system also comprises a proxy management object (PMO) executing in the network, wherein the PMO is configured to classify the first managed system associated with a first active Internet Protocol (IP) address in the network using a plurality of network protocols, identify a set of drivers using the classification, wherein the set of drivers are configured to obtain first management information about the managed system, obtain a first set of drivers, populate data model with the first management information obtain using at least one of the first set of drivers, and manage the first managed system using the data model.

In general, in one aspect, the invention relates to a computer readable medium comprising computer readable program code embodied therein for causing a computer system to classify a first managed system associated with a first active Internet Protocol (IP) address in the network using a plurality of network protocols, identify a set of drivers using the classification, wherein the set of drivers are configured to obtain first management information about the managed system, obtain a first set of drivers, populate a data model with the first management information obtain using at least one of the first set of drivers, and manage the first managed system using the data model.

Other aspects of the invention will be apparent from the following description and the appended claims.

BRIEF DESCRIPTION OF DRAWINGS

FIG. 11 shows a computer system in accordance with one or more embodiments of the invention.

DETAILED DESCRIPTION

Figure 1A:
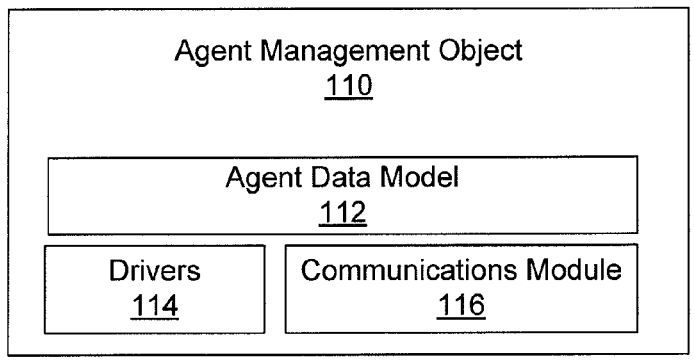
FIGS. 1A-1C show stateless management objects in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for discovering managed systems in a network. More specifically, embodiments of the invention provide method and systems for using system management objects deployed in a network topology to discover managed systems in the network.

FIG. 1A shows a stateless management object in accordance with one or more embodiments of the invention. More specifically, FIG. 1A shows an agent management object (110), which is one type of stateless management object. The agent management object (110) an application used to manage systems in a network. The agent management object (110) executes on a managed system (i.e., a device in the network which is associated with a Internet Protocol (IP) address). The agent management object (110) includes drivers (114A) which are used to communicate with systems managed by the agent management object (110). The agent management object (110) also includes a communications module (116A), which is used to communicate with other management objects in the network topology. The communications module (116A) is configured to receive data from a proxy management object (120, discussed below in FIG. 1B) and to send data to proxy management objects. Said another way, the agent management object (110) includes a 1:1 relationship with a proxy management object. Further, the communications module (116A) typically does not include functionality for the agent management object to communicate with other agent management objects.

In one embodiment of the invention, the agent management object (110) is located in an operating system in a managed system. The agent management object (110) is configured to obtain data about the operating system as well as other components of the managed system on which the operating system executes.

In one embodiment of the invention, the agent management object (110) includes an agent data model (112). The agent data model (112) represents the managed system as a series of objects. For example, the agent data model (112) may include the following objects: an operating system object representing the operating system executing on the managed system, an application object representing an application executing on the operating system, a hardware component object representing a hardware component of the managed system. Each of the objects in the agent data model (112) includes data about the entity it is representing. This data includes data used by the agent management object to manage the represented entities. The data is obtained using drivers (114A) and/or other functionality in the agent management object (110) configured to interrogate the operating system (e.g., requesting the operating system to issues system calls and receiving the subsequent responses).

Figure 1B:
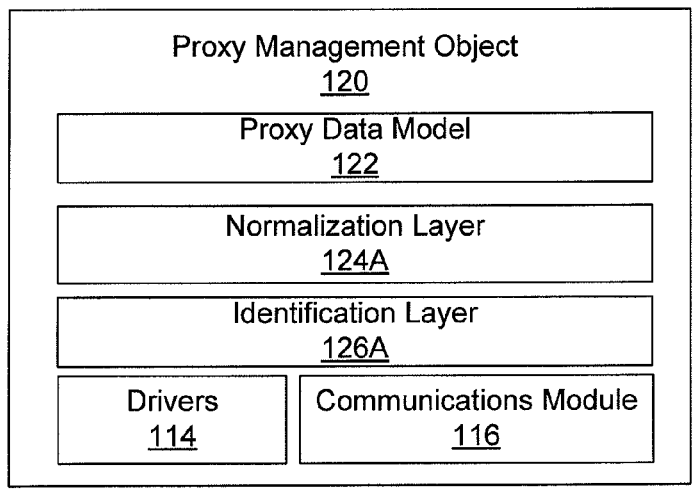

FIG. 1B shows a stateless management object in accordance with one or more embodiments of the invention. More specifically, FIG. 1B shows a proxy management object (120), which is another type of systems management object that executes on a managed system. Similar to the agent management object (110), the proxy management object (120) is an application used to manage systems on a network. The proxy management object may be located on a network device in a datacenter, such as a router.

Some of the components in proxy management object (120) are similar component to the agent management object (110). However, the proxy management object (120) includes additional functionality not present in the agent management object. Specifically, the proxy management object (120) includes drivers (114B) that allow the proxy management object (120) to obtain data about the managed system upon which it is executing and to obtain data about managed systems over a network connection. Further, the proxy management object (120) includes a communications module (116A), which enables the proxy management object (120) to communicate with one or more agent management objects and to communicate with a satellite management object (130). In one embodiment of the invention, there is a many:1 mapping between agent management objects and the proxy management object and a 1:1 relationship with proxy management objects and satellite management objects.

The proxy management object (120) also includes a normalization layer (124A). The normalization layer is configured to receive data from the drivers (114B) and the communications module (116B) to determine which of the received data to propagate to the proxy data model (122). More specifically, if normalization layer (124A) receives data for a given object (e.g., a hardware component on a managed system) from both the agent management object executing on the managed system as well as a driver (114B) on the proxy management object, the normalization layer includes functionality to determine which of the received data to use. The normalization layer typically uses a normalization model to perform the normalization.

The proxy management object also includes a proxy data model (122). The proxy data model includes objects that represent entities (hardware components, software components, systems, etc.) which are managed, directly and indirectly, by the proxy management object (120). More specifically, the proxy data model (122) may include the following objects: (i) objects present in the agent data models (112) to which the proxy is connected and (ii) objects corresponding to (or associated with) the managed system upon which the proxy management object is executing.

The proxy management object also includes an identification layer (126A). The identification layer may include a neural network (or a portion thereof) (defined below) and a systems identification module. The identification layer includes the functionality to identify other systems management objects to which the proxy management object is operatively connected. Further, according to one or more embodiments of the invention, the identification layer may also include a taxonomy, which maps classifications of managed systems to drivers that may be used to manage the managed systems. The functionality of the identification layer is discussed below.

Figure 1C:
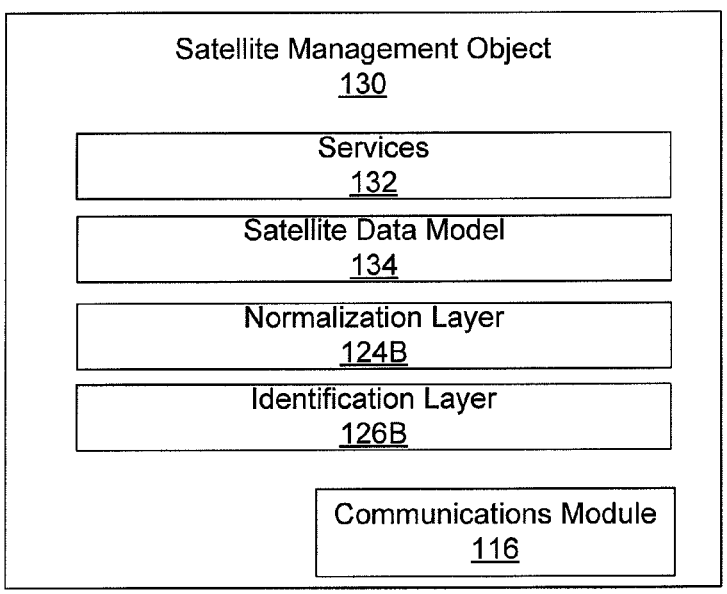

FIG. 1C shows a stateless management object in accordance with one embodiment of the invention. More specifically, FIG. 1C shows a satellite management object (130), which is another type of systems management object that executes on a managed system. The satellite management object (130) includes components similar to the proxy management object and the agent management object; however, the satellite management object includes some additional functionally.

The satellite management objet (130) includes a communications module (116C). The communications module (116C) is used to communicate with other systems management objects (e.g., proxy management object, agent management objects) in the network. In addition, the communications module (116C) may also be configured to communicate with a management user interface (not shown). The management user interface allows a user to communicate with the satellite management object. The satellite management object may then communicate requests, updates, etc. received from the management user interface to other managed systems (via the associated proxy management objects and/or agent management objects) in the network using the communications module (116C).

The satellite management object (130) may communicate with the proxy management objects using a publish/subscribe system, such as Secured Socket Layer (SSL)/ATOM in combination with traditional communication techniques. Thus, data from the proxy management objects may be sent to the satellite management object (130) (i.e., pushed from the proxy management objects to the satellite management object). This data may include management data, which is data that allows objects in the system to be managed. Further, requests from the satellite management object that are to be communicated to the proxy management objects are placed on appropriate queues within the satellite management object (now shown) to which the proxy objects subscribe. The appropriate management proxies will then be notified and subsequently pull the request from the satellite management object.

The satellite management object (130) also include a normalization layer (124B), which operates in the same manner as the normalization layer (124A) in the proxy management object. Further, similar to the proxy management objects, the satellite management object includes a satellite data model (134). The satellite data model (134) in objects that represent entities (e.g., hardware components, software components, systems, etc.) which are managed, directly and indirectly, by satellite management object.

The satellite management object (130) also includes services (132). These services (132) allow the satellite management object to discovery the managed systems being managed by the satellite management object (130). The result of the discovery services is additional data about the managed systems, which may then be used for further management of the managed systems. The services may facilitate systems management, such as optimizing power utilization, deployment of software upgrades, deployment of new software, modification of managed system configuration, optimizing the rate of data transfer across the network, etc.

With respect to power utilization, the services (132) may be used to, for example, determine. (i) resource usage of the various management systems and (ii) application present on the managed systems. The services (132) may then use this information to determine if a process executing on a given managed system may be migrated to another managed system. If the migration can occur, then the satellite management object may initiate the migration and then initiate the powering down in the managed systems after the migration is complete.

The satellite management object also includes an identification layer (126B). The identification layer may include a neural network and a systems identification module. In one embodiment of the invention, the neural network includes a managed system classifications mapped responses to network protocols. Further, the neural network includes functionality to ultimately classify a managed system by analyzing the responses to network protocols received from the managed system. As part of the analysis, the neural network may receive a first response and, based on this response, determine a subsequent network protocol to use to aid in the classification of the managed system.

For example, the neural network may receive response 1 (R1) and based on R1 determine that the managed system may be classified as C1-05. To further narrow down the classification, the neural network may then suggest a second request using another network protocol and receive a second response (R2). Using R2, the neural network may then narrow the classification to C3-05. The neural network may then continue to repeat the above process until an ultimate classification for the managed system is determined.

Continuing with FIG. 1C, the identification layer includes functionality to identify other systems management objects to which the satellite management object is operatively connected. Further, according to one or more embodiments of the invention, the identification layer may also include a taxonomy, which maps classifications of managed systems to drivers that may be used to manage the managed systems.

In one embodiment of the invention, a given network may include multiple satellite management objects, proxy management objects, and agent management objects. Further, network may include a layer of agent management objects each of which are operatively connected to one or more proxy management objects. The proxy management objects may in turn be operatively connected to other proxy management objects and/or satellite management objects.

In one embodiment of the invention, the satellite management object, and proxy management object, and the agent management object communicate with each other using a publish/subscribe model. For example, an agent management object may subscribe to a proxy management object (or more specifically a queue when the proxy management object). Similarly, a proxy management object may subscribe to a satellite management object (or more specifically a queue when the satellite management object). In each of the aforementioned cases, the lower level systems management object (i.e., the agent management object and the proxy management object, respectively) initiate the connection with the higher level systems management objects (i.e., the proxy management object and the satellite management object, respectively) to determine whether there are jobs (discussed below) to pull from the higher level systems management object.

In one embodiment of the invention, the connections are established at one-minute intervals. More specifically, at one-minute intervals a connection is established between, for example, the agent management object and the proxy management object. Once opened, the connection remains open while the agent management object determines whether there are jobs to retrieve from the proxy management object and the jobs (if any, are retrieved). The connection is then closed. Those skilled in the art will appreciate that connections may be opened at shorter or longer time intervals.

In one embodiment of the invention, when a job is initially placed on a job queue, a determination is made about whether the job is a light weight job (i.e., the job consumes less than a pre-defined amount of resources, e.g., a name change operation). In such cases, the light weight jobs are placed in a separate high priority queue (or in a high priority portion of the job queue). In such cases, the connections are established at three-second intervals by a lower level systems object to determine to presence of any light weight jobs. The connection to determine whether there are any light weight jobs once opened, remains open while the job is obtained, executed, and a response is provided the lower level systems object to the higher level systems object. The connection is then closed. Those skilled in the art will appreciate that connections may be opened at shorter or longer time intervals.

Thus, a given systems management object may communicate with another systems management object using two different connection mechanisms: (i) connections for non-light weight jobs and (ii) connections for light weight jobs. The definition of a light weight job may defined on a per-implementation basis.

In one embodiment of the invention, non-light weight jobs are ordered within the job queue based on, for example, priority of the job, type of job, amount of time the job has been in the queue. Further, the systems management objects remove jobs from the front of the job queue for processing.

Figure 2:
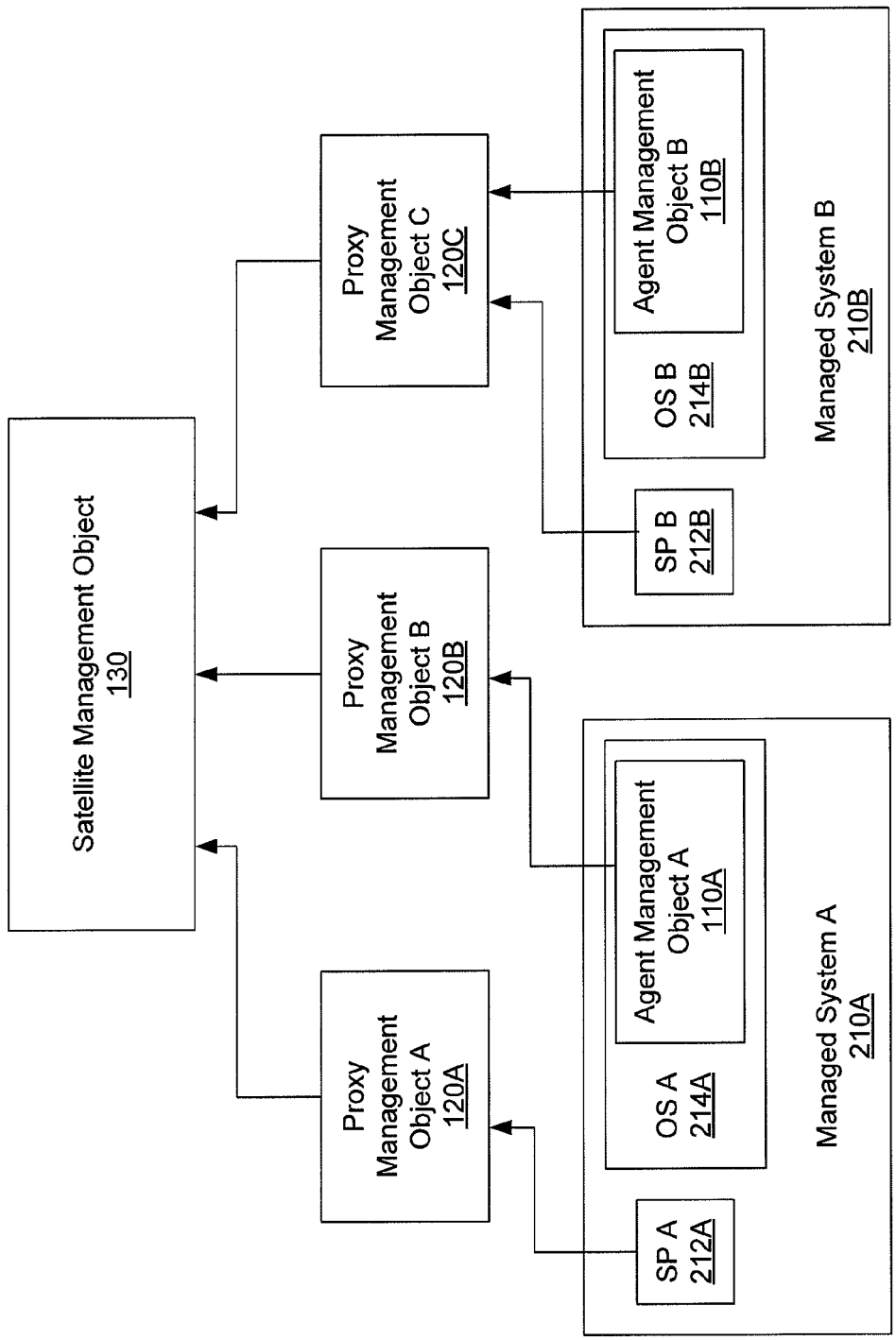
FIG. 2 an example in accordance with one or more embodiments of the invention.

FIG. 2 shows an example in accordance with one or more embodiments of the invention. The example is not intended to limit the scope of the invention. Turning to the example, the system includes a satellite management object (130) operatively connected to three proxy management objects (120A, 120B, 120C). Further, proxy management object B (120B) is operatively connected to agent management object A (110A) and proxy management object C (120C) is operatively connected to agent management object B (110B). Agent management object A (110A) is executing on managed system A (210A) and agent management object B (110B) is executing on managed system B (210B). Each of the managed systems (210A, 210B) includes a service processor (212A, 212B) and an operating system (214A, 214B).

As shown in FIG. 2, proxy management object A (120A) is configured to obtain information directly (i.e., without the involvement of agent management object A (110A)) from service processor (SP) A (212A). Further, proxy management object A (120A) is configured to directly (i.e., without the involvement of agent management object A (110A)) manage SP A (212A).

Proxy management object B (120B) is configured to obtain data from agent management object A (110A). More specifically, proxy management object B (120B) obtains data from an agent data model (not shown) populated and maintained by agent management object A (110A). Further, proxy management object B (120B) is configured to directly manage agent management object A (110A). By managing agent management object A (110A), proxy management object B (120B) may indirectly manage operating system A (214A) as well as hardware components (which may include SP A (212A)) managed by operating system A (214A). Finally, proxy management object C (120C) is configured to obtain data directly from managed system B (210B) as well as indirectly via agent management object B (110B).

Though not shown in FIG. 2, the proxy data models populated and maintained by the proxy management objects (120A, 120B, 120C) are communicated to the satellite management object (130) and used to populate a satellite data model (not shown). In populating the satellite data model, the satellite management object (130) may implement a normalization layer (not shown). For example, both proxy management object A (120A) and proxy management object B (120B) may include an object in their respective proxy object models which represents SP A (212A). In this scenario, the satellite management object (130) may use a normalization policy to determine which data (i.e., data from proxy management object A (120A) and proxy management object B (120B)) to use to populate the object representing SP A (212A) in the satellite management object.

Figure 3:
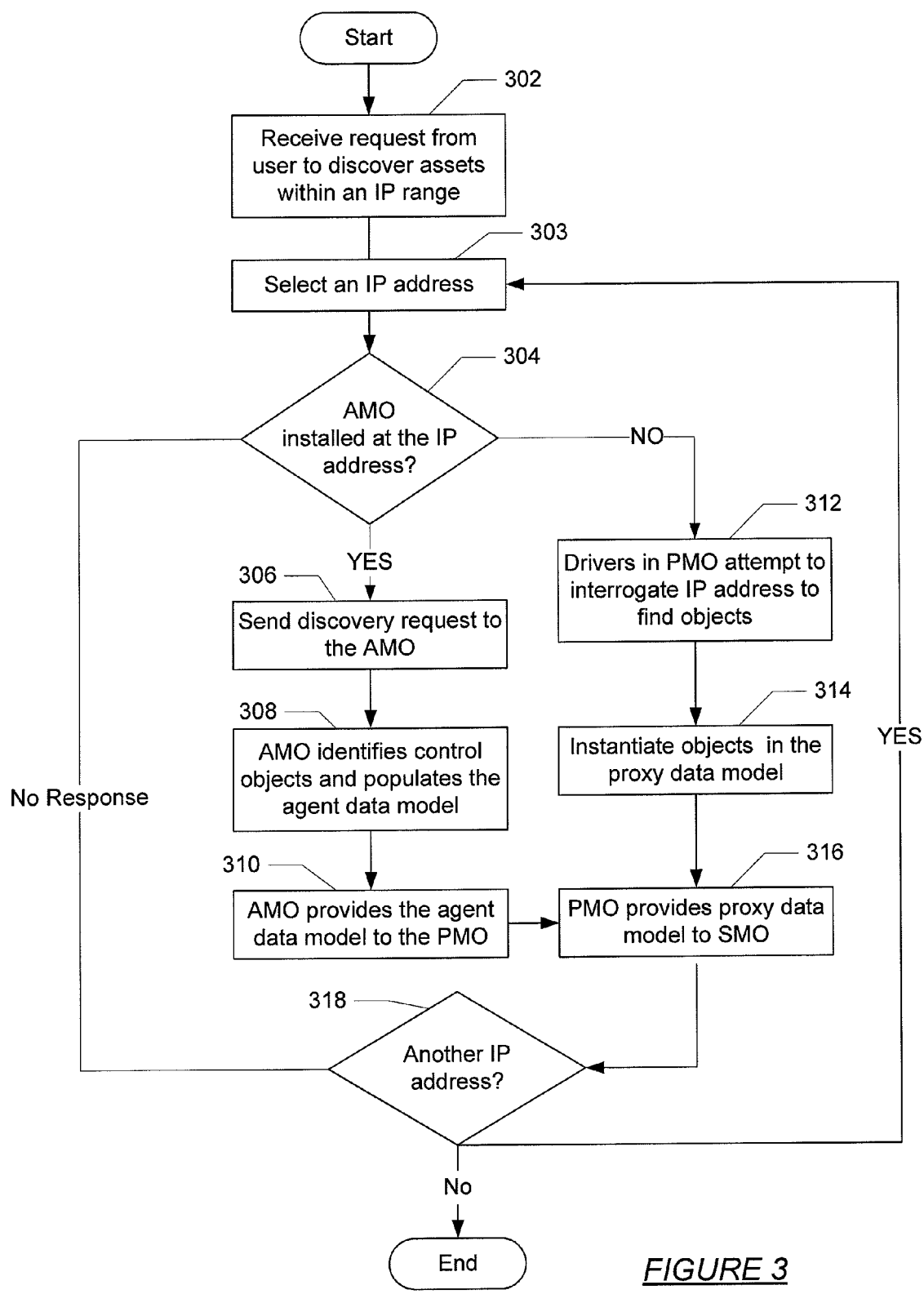
FIG. 3 shows a flowchart in accordance with one or more embodiments of the invention.

FIG. 3 shows a flowchart in accordance with one or more embodiments of the invention. More specifically, FIG. 3 shows a flowchart of a method for discovering assets in a network in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

At 302, a request is received from a user to discover assets within a range of IP addresses. According to one or more embodiments of the invention, the satellite management object (SMO) receives the request and the range of IP addresses via a management user interface. Alternatively, discovery may be triggered automatically by the SMO. At 303, a first IP address in the range on IP addresses is selected. At 304, a determination is made about whether an agent management object (AMO) is installed on the system identified with the IP address. The determination in 304 may be performed by reviewing the satellite data model, by reviewing the appropriate proxy data model, and/or by sending (using TCP/IP) a request to the system and awaiting a response from the system.

If an AMO is present on the system at the IP address, then the method proceeds to 306. At 306, a discovery request is sent to the AMO. As described above, the systems management objects communicate with each other using a publish and subscribe system, such as SSL/ATOM. Accordingly, a request is added to the queue corresponding to the AMO, where the queue is located in a proxy management object (PMO) and/or a SMO.

In one embodiment of the invention, the request is initially placed on a queue corresponding to a PMO. After the PMO retrieves the request, the PMO may place the request on the queue corresponding to the AMO. As discussed above, the AMO subsequently retrieves and processes the request.

Returning to FIG. 3, at 308, the AMO identifies objects that it manages and populates the agent data model appropriately. According to or more embodiments of the invention, the AMO may identify objects it manages by instantiating one or more drivers and then using the drivers to obtain information about the managed system upon which it is executing. The AMO may also include functionality to query the operating system upon which it is executing for information (e.g., configuration information, version numbers, serial numbers, build number, software vendor, manufacturer, OEM information, power management capabilities, etc.) about software components (e.g., applications, operating systems, virtualization software, etc.) and hardware components (e.g., processors, memory, persistent storage, peripherals, network interface cards, etc.) Using the aforementioned information, the AMO subsequently populates the agent data model.

At 310, the AMO provides the agent data model to the PMO (to which it is operatively connected). According to one or more embodiments of the invention, this may be done using the communications modules located in the AMO and the PMO. At 316, the PMO provides an updated proxy data model to the SMO. Those skilled in the art will appreciate that only the updates may be communicated to the SMO and/or the PMO may only send updates to the SMO after a minimum number of updates have been received by the PMO. At 318, a determination is made about whether there is another IP address within the IP range to query. If additional IP addresses exist, the method proceeds to 303. Alternatively, the method ends.

Returning to 304, if no AMO is installed on the system at the IP address then the process proceeds to 312. At 312, drivers in the PMO interrogate the system at the IP address. More specifically, the PMO executing on a remote system (e.g., a system connected over a network connection to the system at the IP address) locates hardware and/or software components in the system at the IP address which may be represented as objects in the proxy data model.

At 314, the identified objects are instantiated into the proxy data model. At 316, the PMO provides the proxy data model (as discussed above) to the SMO. According to one or more embodiments of the invention, by sending data models from the AMO to the PMO, and further to the SMO, the entire system becomes fully inspectable by the systems management objects. The method then proceeds to 318. Returning to 304, if system at the IP address does not respond (i.e., the PMO or SMO cannot ascertain whether that the system at the IP address does or does not have an AMO), then the process proceeds to 318. The aforementioned steps are repeated until all IP addresses in the range of IP addresses are interrogated.

Figure 4:
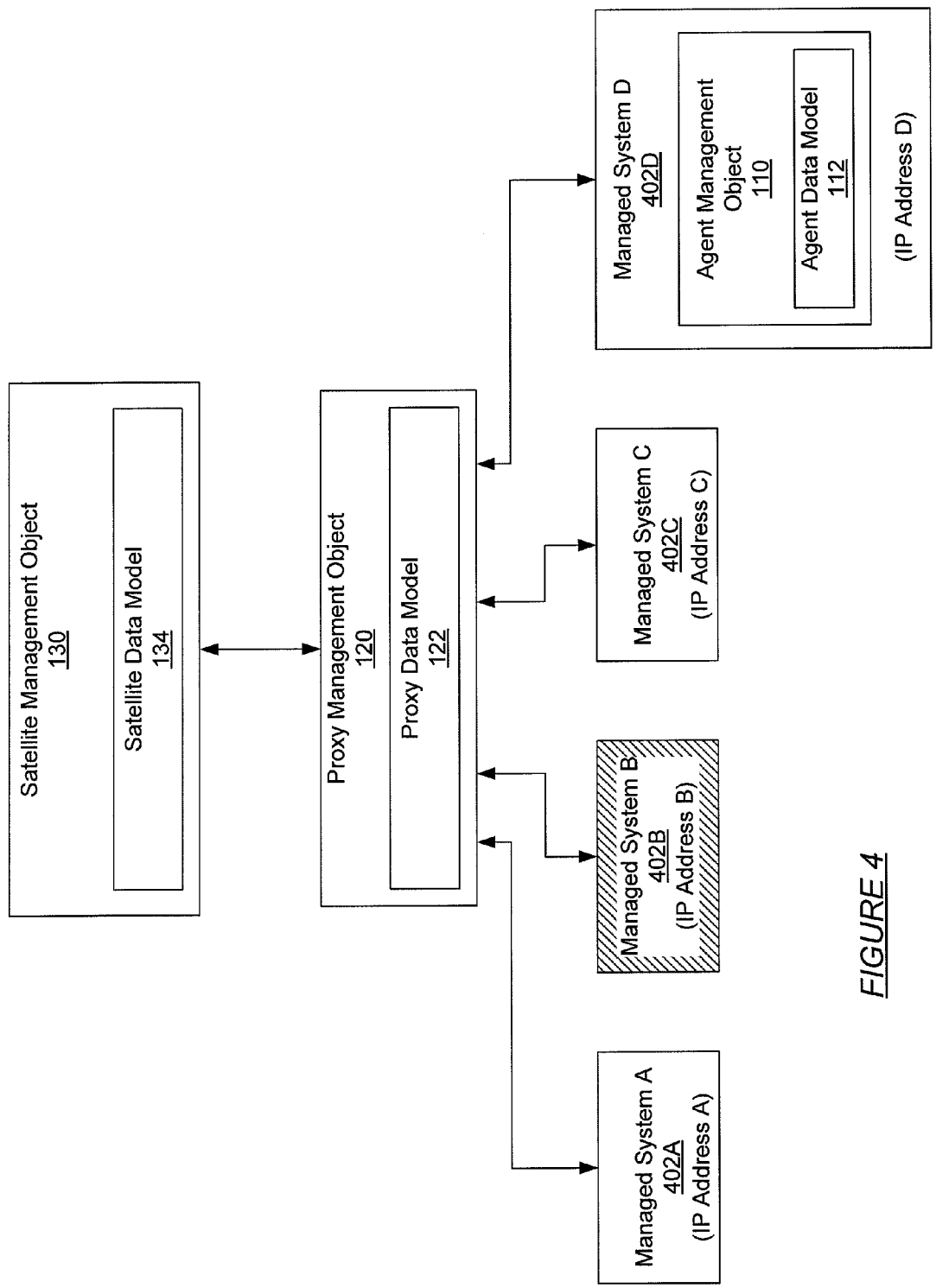
FIG. 4 shows a system in accordance with one or more embodiments of the invention.

FIG. 4 shows an example in accordance with one or more embodiments of the invention. More specifically, FIG. 4 shows an example of using the method shown in FIG. 3. The following example is not intended to limit the scope of the claims.

Turning to the example, a request for discovery is initially received by the satellite management object. It is important to note that discovery may occur at any level, but for purposes of this example the request is sent to the satellite management object (130). The request includes the following IP address range: IP address A-IP address E. Those skilled in the art will appreciate that the IP address range may be specified in any manner without departing from the invention. Upon receipt of the request, the satellite management object (130) determines that the proxy management object (PMO) (120) is the only (PMO) within the IP address range. Accordingly, the SMO (130) queries the PMO (120) to obtain its proxy data model. At this stage, the PMO (120) may already have an up-to-date proxy data model and, accordingly, once the SMO (130) receives the proxy data model, the discovery of managed systems in the IP address range is complete.

However, if the PMO (120) does not include an up-to-date proxy data model, the PMO attempts to interrogate IP addresses in the range to find managed systems. Specifically, the PMO (120) sends requests to IP addresses A-E, and receives back responses from managed systems A, C, and D. Managed system B, while in the IP address range is currently powered down and, accordingly, does not respond to the request. Further, the PMO (120) determines that managed system D (402D) includes an agent management object (AMO) (110).

Based on the above responses, the PMO (120) queries managed systems A and C (402A, 402C) to determine hardware and/or software components to represent as objects in the proxy data model (122). Further, the PMO (120) obtains the agent data model (112) from the AMO (110) executing on managed system D (402D).

After the proxy data model (122) has been populated with objects representing hardware and/or software components in managed system A (402A), managed system B (402B), and managed system D (402D), the PMO (120) communicates the proxy data model (122) to the SMO (130). Those skilled in the art will appreciate that some networks may include multiple levels of PMOs. In such cases, the PMO (120) might communicate the proxy data model (122) to one or more other PMOs (not shown) before the proxy data model (which may also include objects from the intervening PMOs) is communicated to the SMO (130).

Figure 5:
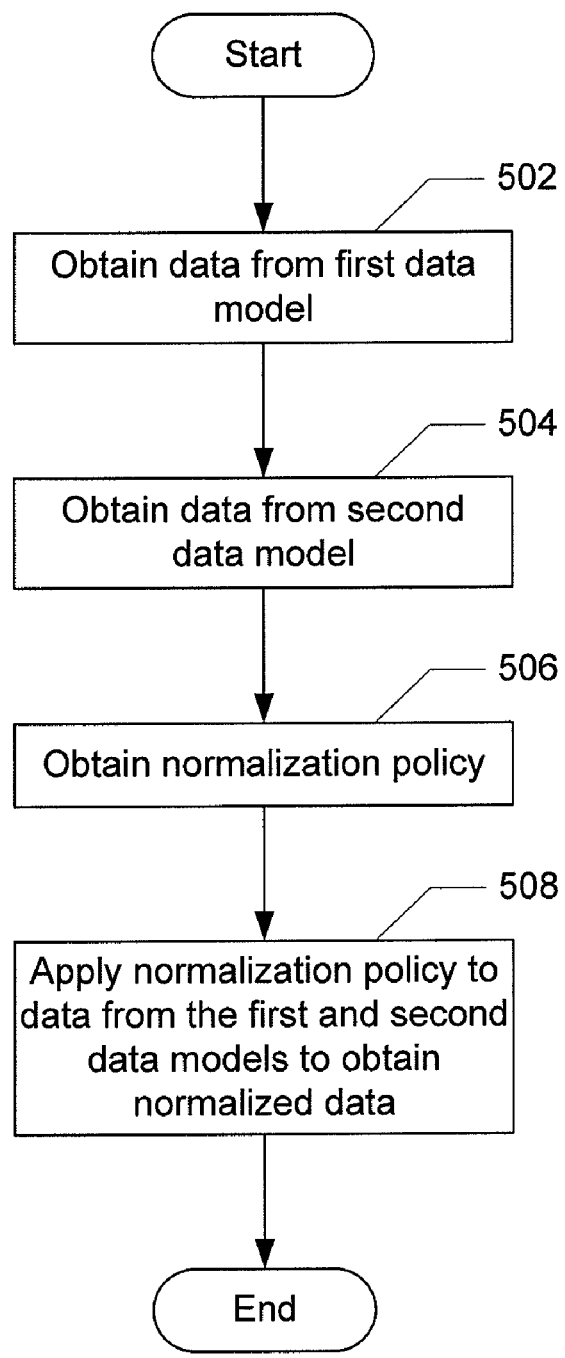
FIG. 5 shows a flowchart in accordance with one or more embodiments of the invention.

FIG. 5 shows a flowchart in accordance with one or more embodiments of the invention. Specifically, FIG. 5 shows a flowchart of a method for normalizing in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

At 502, a first data model is received from a systems management object. According to one or more embodiments of the invention, the systems management object may be an agent management object or a proxy management object, and may be received a proxy management object or a satellite management object. Similarly, at 504, a second data model is received for another systems management object.

At 506, a normalization policy is obtained. According to one or more embodiments of the invention, this policy may be stored in the proxy management object or the satellite management object. The normalization policy may change depending on the needs of the user. For example, if the user is managing the system for power management, this will affect the method of managing that object and the normalization policy will be configured to normalize the data accordingly. In particular, the normalization policy favor sources of data which are more accurate with respect to resource usage and/or power consumption. Said another way, if two sources provide data about the same hardware component but one source is considered to provide more accurate information with respect to resource usage and/or power consumption, then this source is favored over the other source.

At 508, the normalization layer applies the normalization policy to data from the first and second data models to obtain normalized data. The normalized data is then used to populate the appropriate proxy data model or satellite data model.

Figure 6:
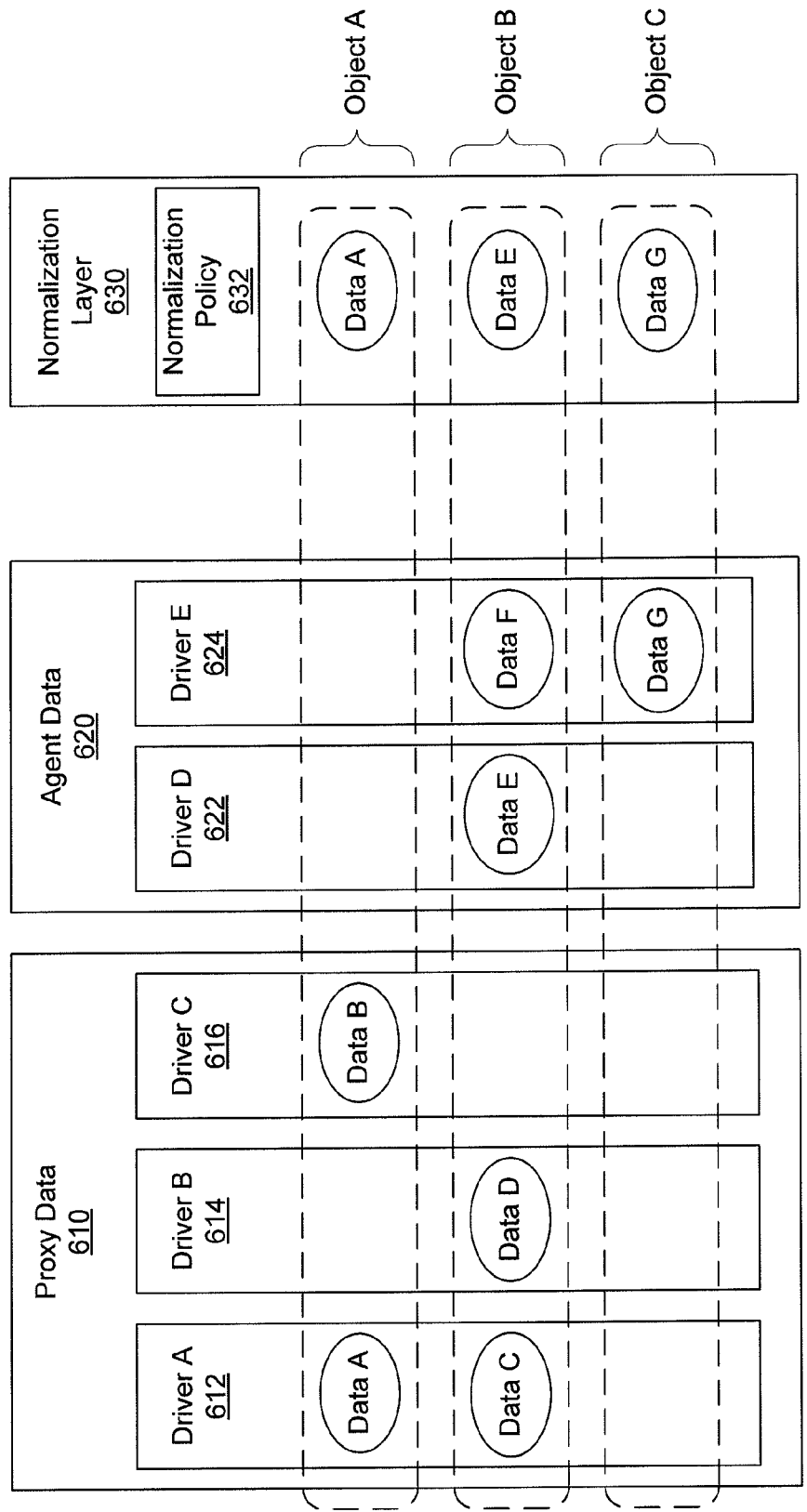
FIG. 6 shows a example in accordance with one or more embodiments of the invention.

FIG. 6 shows an example in accordance with one or more embodiments of the invention. The example is not intended to limit the scope of the invention. In the example shown, the normalization layer (630) receives data from a proxy management object (610) and from an agent management object (620).

The data received from the proxy management object (610) includes information from Driver A (612), Driver B (614), and Driver C (616). Driver A provides Data A about Object A and Data C about Object C. Driver B also is able to obtain data (Data B) about Object B. Finally, Drive C is able to obtain data (Date B) about Object A.

The normalization layer (630) also receives data from an agent management object (620). The data from the agent management object includes information obtained from Driver D (622) and Driver E (624). Driver D provides Data E about Object B, and Driver E provides Data F about Object B and Data G about Object C.

After receiving the proxy data (610) and the agent data (620), the normalization layer normalizes the data. As shown, the normalization layer determines which of the sources to use to populate each object. As shown in FIG. 6, Data A and Data B are shown to correspond to the same object. Similarly, Data C, Data D, Data E, and Data F are shown to correspond to a second Object. Finally, Data G is shown to be the only data received that corresponds to a third object.

The normalization layer (630) uses a normalization policy (632) to determine how data is normalized. For example, if a user is managing a system for power management purposes, it may be beneficial to manage the first object using Data A rather than Data B. Accordingly, Data A is chosen. Similarly, Data E is chosen for the second object. Finally, Data G is the only data received by the normalization layer for the third object and, accordingly, Data G is used to populate object C. According to one or more embodiments of the invention, the normalized data may now be used to create a data model for the systems management object that includes the normalization layer (630).

The following is another example of how the normalization layer may be used to normalize data from multiple sources. Turning to the example, consider a scenario in which a managed system includes a Lights Out Management (LOM) module. The LOM module may be discovered by a proxy management object using direct network access. In addition, the LOM module may be discovered using an agent management object executing on the operating system within the managed system using system calls. The normalization layer located in the proxy management object may obtain data about the LOM module from both the proxy management object and the agent management object. Upon receipt of this data, the normalization layer, using a normalization policy, determines which data (i.e., data from the proxy management object and data from the agent management object) to use in the proxy data model.

In one embodiment of the invention, the service management objects may be placed on systems within the network at any point in time. Once a service management object is placed on a system in the network, the service management object attempts to locate other service management objects. For example, if an agent management object is placed in the network, the agent management object may attempt to locate proxy management objects and/or satellite management objects with which to communicate.

The agent management object, upon locating other system management objects, may query the system management object to determine whether the system management object includes any objects in its data model which describes the system upon which the agent management object is executing. Using this information along with information obtained from the system directly, the agent management object may then generate an agent data model. The agent data model may be subsequently be used to update the data models on other system management objects.

Further, if a proxy management object is deployed on a system in the network, the proxy management object may attempt to locate both agent management objects and satellite management objects. The proxy management object may subsequently use the located satellite management objects and agent management objects to populate the proxy data model. The proxy management object may concurrently attempt to populate its own proxy data model using its own drivers.

Using the above functionality, systems management objects may be deployed through out the life cycle of the datacenter and, in the event a proxy management object is removed or fails, the remaining systems management objects may reconfigure their communications paths using, for example, the discovery mechanism shown in FIG. 3. Further, regardless of which system management objects are present in the network at any given time, the normalization layer may be used to provide a consistent view of the objects being managed within the network.

In one embodiment of the invention, the asynchronous communication protocols (e.g., SSL/ATOM) allow the systems management objects to communicate in network without monopolizing bandwidth within the network.

Figure 7:
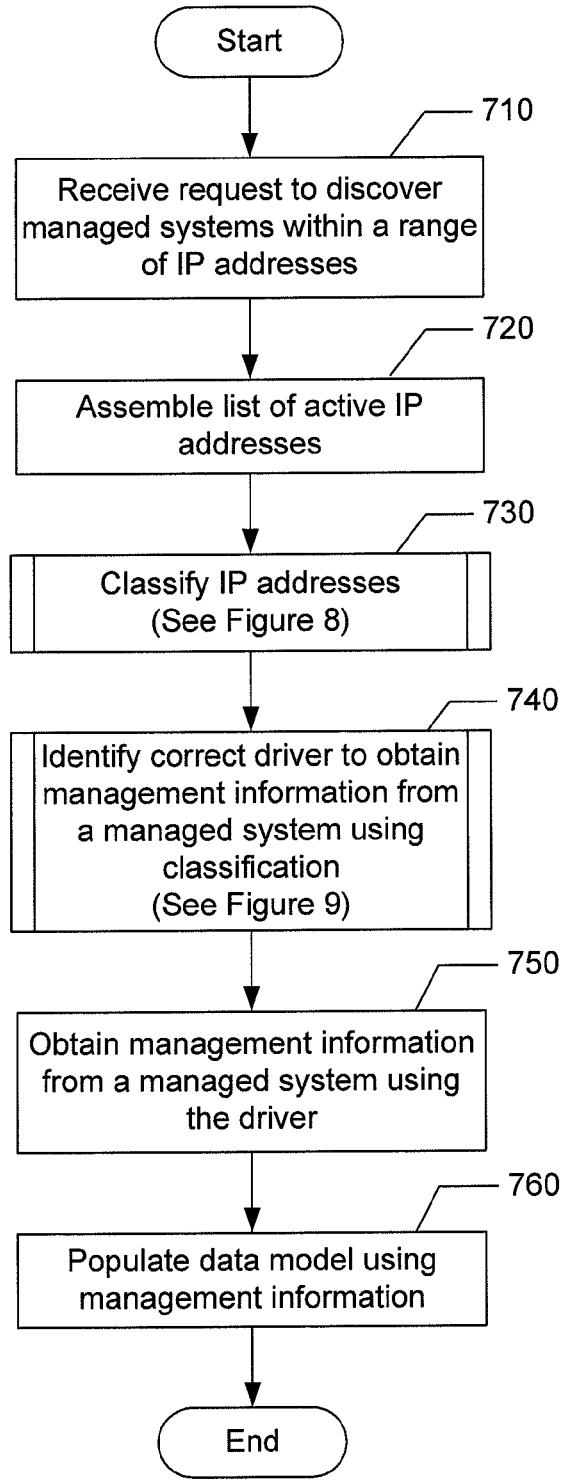
FIG. 7 is a flowchart in accordance with one or more embodiments of the invention.
Figure 8:
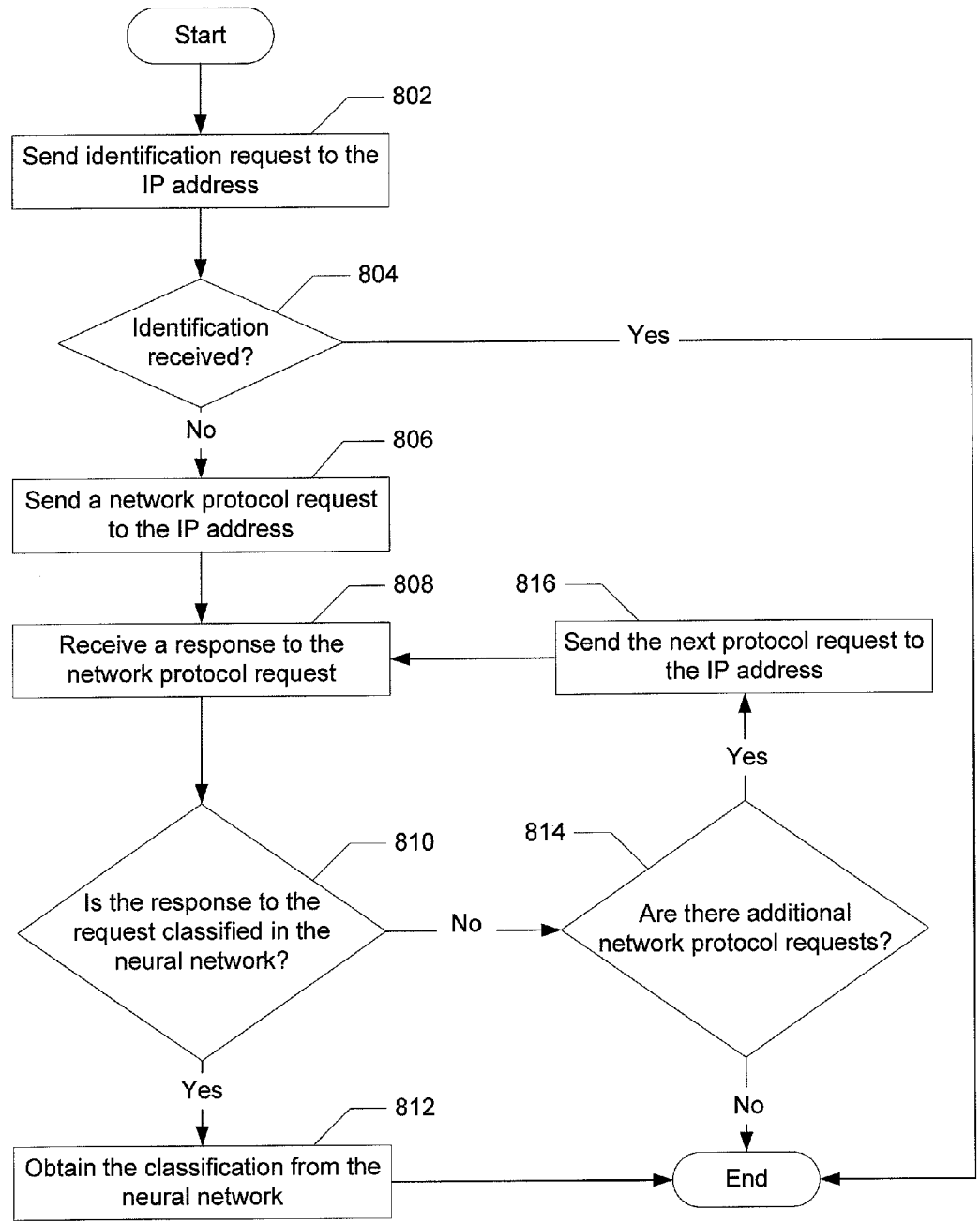
FIG. 8 is a flowchart in accordance with one or more embodiments of the invention.
Figure 9:
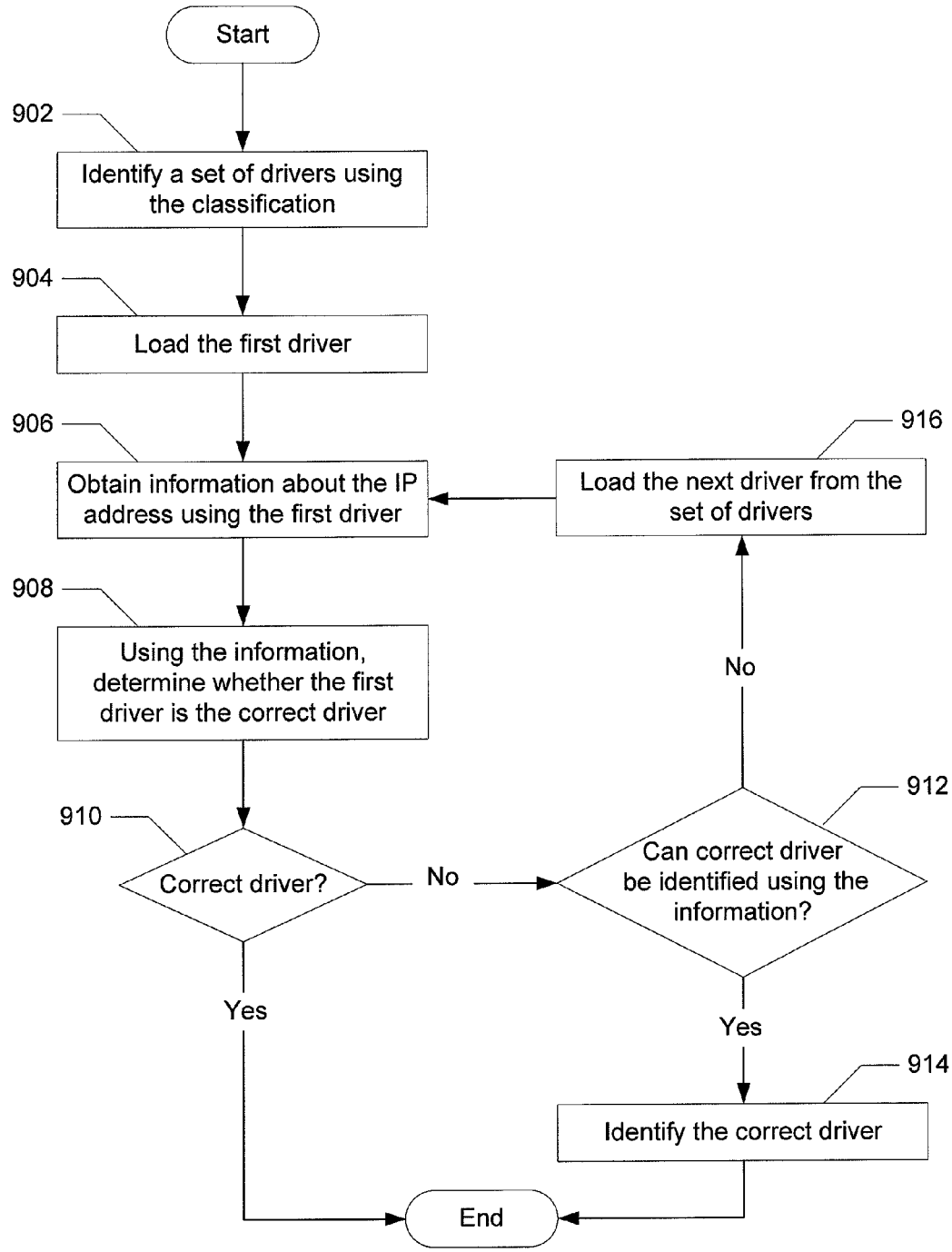
FIG. 9 is a flowchart in accordance with one or more embodiments of the invention.

FIGS. 7-9 represent a flowchart in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

Turning to FIG. 7, FIG. 7 shows a flowchart of a method for discovering managed systems in a network. At 710, a systems management object receives a request to discover managed systems within a range of IP addresses. According to one or more embodiments of the invention, the systems management object may be a proxy management object or a satellite management object. Further, the range of IP addresses may be provided by a user.

At 720, the systems management object assembles a list of active IP addresses from the range of IP addresses. According to one or more embodiments of the invention, active IP addresses may be identified using such methods as router interrogation, a check for IP activity, by issuing a multicast protocol message. Each of the active IP addresses corresponds to a managed system.

At 730, the systems management object classifies the active IP addresses. According to one or more embodiments of the invention, IP addresses are classified in the identification layer of the systems management object. The classification phase is described in FIG. 8. In one embodiment of the invention, the method shown in FIG. 8 may be performed for multiple managed systems in parallel.

Referring to FIG. 8, a flowchart according to one or more embodiments of the invention is shown. Specifically, FIG. 8 shows a flowchart of a method for classifying IP addresses, according to one or more embodiments of the invention. At 802, the systems management object sends a request for identification to the IP address. According to one or more embodiments of the invention, some managed systems include a systems identification mechanism, which provides an identification number and a system type.

At 804, if the systems management object receives the identification information from the IP address, the system type is the classification of the IP address and the classification phase is complete for this particular managed system. If no identification information is received by the systems management object, then the method proceeds to 806.

At 806, the systems management object sends a network protocol request to the IP address. According to one or more embodiments of the invention, the network protocol request may include such protocols as a ServiceTag protocol, Secured Shell (SSH), Management Information Base (MIB), Intelligent Platform Management Interface (IPMI) protocol, simple network management protocol (SNPM), Internet Control Message Protocol (ICMP), etc.

At 808, the systems management object receives a response to the network protocol request. According to one or more embodiments of the invention, managed systems may be classified using responses to protocol requests. A neural network in the systems management object provides a mapping between responses to certain protocol requests, such as those described above, and managed systems classifications.

At 810, if the response to the protocol request is classified in the neural network, then at 812 the systems management object obtains the classification for that response and the classification system for this managed system is complete.

Returning to 810, if the response to the protocol request can not be classified in the neural network, then further interrogation using other network protocol requests is necessary. According to one or more embodiments of the invention, it may be necessary to receive responses to multiple network protocol requests in order to classify the managed system.

At 814, if there are further network protocol requests (i.e., different request using the same network protocol or different requests sent using different network protocols) to send to the IP address, then at 816, the systems management object sends the next network protocol request to the IP address and the process proceeds to 808. The protocol selected in 816 may be determined based on the response received when the previous network protocol request was sent. The process continues as described above until the managed system is classified by the neural network or a determination is made that the managed system cannot be classified.

In one embodiment of the invention, the complete neural network is located in a satellite management object and only portions of the neural network are provided to the proxy management objects to classify managed systems. For example, the proxy management object may initially be provided with a first portion of the neural network and use the first portion of the neural network along with a response to a network protocol request to classify the managed system. If no classification is made, the satellite management object may transmit a second portion of the neural network to the proxy management object for use in classifying the managed system. In such cases, the second portion of the neural network transmitted to the proxy management object is based on the previous response to the network protocol request to received by the proxy management object.

Returning to FIG. 7, at 740, the correct driver is identified to obtain management information from a managed system using the classification identified in 730. According to one or more embodiments of the invention, the systems management object contains a number of drivers. To retrieve the correct management information from the managed system, the correct driver to communicate with the managed system is first identified. The method for identifying the correct driver is shown in FIG. 9.

Referring to FIG. 9, FIG. 9 shows a flowchart of a method for identifying the correct driver to obtain management information from a managed system, according to one or more embodiments of the invention. At 902, the systems management object identifies a set of drivers which may include the correct driver using the classification, as described in FIG. 8. According to one or more embodiments of the invention, the systems management object includes a set of drivers (or access thereto).

At 904, the first driver of the set of drivers is loaded into the systems management object. At 906, information about the managed system at the IP address is obtained using the first driver. According to one or more embodiments of the invention, the information obtained allows the systems management object to identify the managed object.

At 908, systems management object uses the information obtained at 906 and determines whether the first driver is the correct driver. According to one or more embodiments of the invention, even if a driver returns some information about the managed object, it may not be the correct driver if the information is incomplete. For example, one driver may be able to get a model name using an IPMI protocol from a service processor, but realize that it is the wrong driver for based on the retrieved model name.

At 910, if the selected driver is the correct driver, then the driver identification phase is complete and the systems management object continues to use the driver to communicate with the managed object. If the systems management object determines that the selected driver is not the correct driver, then further interrogation is required.

At 912, the systems management object determines the correct driver may be identified using the information. As described above, the information gathered from an incorrect driver may be sufficient to determine the correct driver. At 914, if the correct driver is identified, then the driver identification phase is complete.

At 916, if the systems management object is still unable to determine the correct driver using the information obtained in 908, the next driver from the set of drivers is loaded and the process then proceeds to 906. In one embodiment of the invention, the 916 includes determining the next driver from the set of drivers based on management information obtained by the previous driver. The determination in 916 may be performed.

The method in FIG. 9 is repeated until the correct driver is located or the most appropriate driver (of the available drivers) is located (e.g., managed system may include hardware component with firmware version 1.1 and the only available driver is from the hardware with firmware version 1.0).

Returning to FIG. 7, at 750, the systems management object obtains management information from the managed system using the selected driver from 740. According to one or more embodiments of the invention, the management information obtained identifies the managed system and allows for management of the managed system.

At 760, the systems management object populates a data model using the management information. In one embodiment of the invention, 760 may be performed in parallel for multiple managed system. Said another way, the data model may be populated management information from multiple managed systems in parallel. According to one or more embodiments of the invention, the data model may be a proxy data model or a satellite data model. Further, these data models may be used to manage the managed system.

Figure 10:
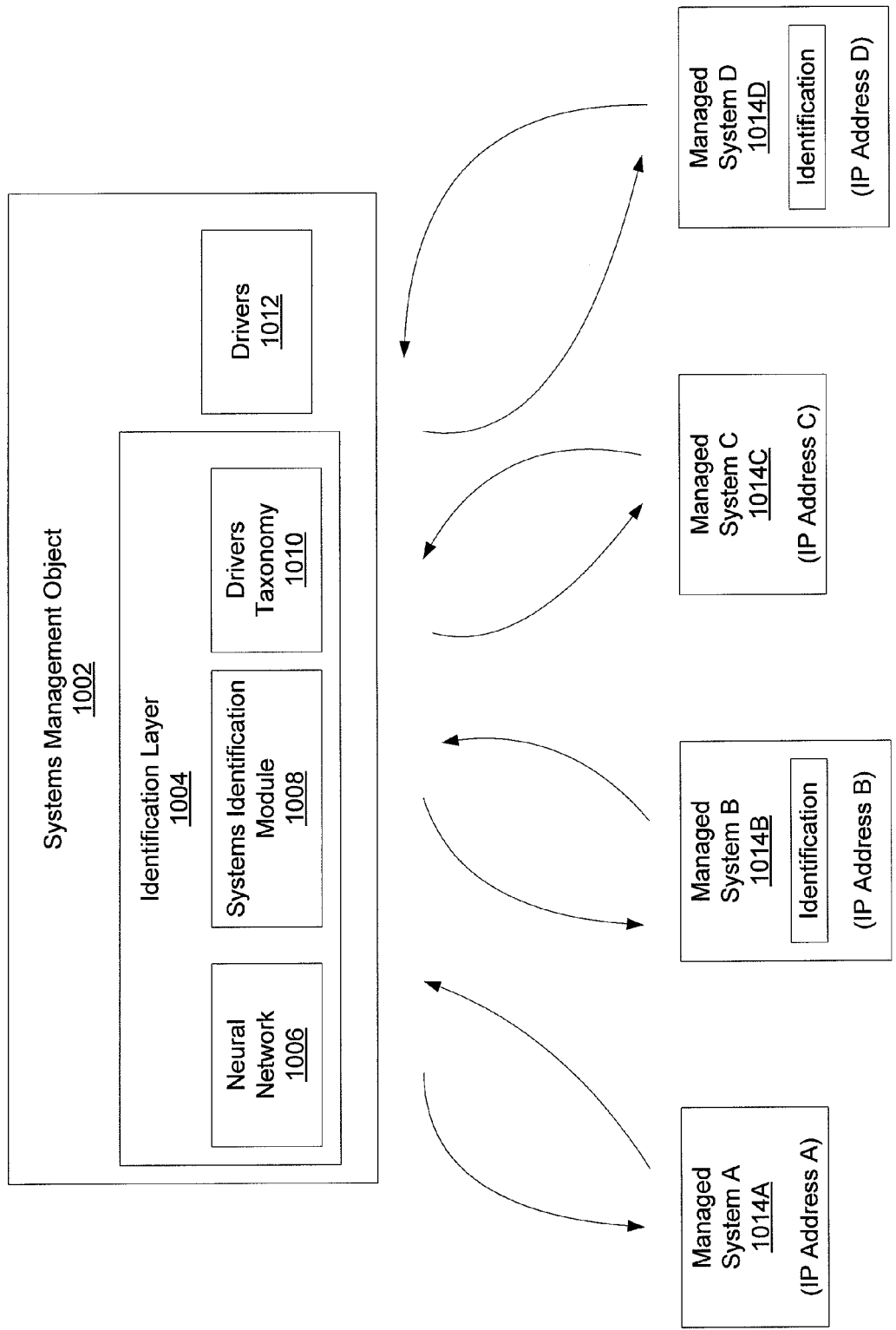
FIG. 10 is a system in accordance with one or more embodiments of the invention.

FIG. 10 is a system in accordance with one or more embodiments of the invention. More specifically, FIG. 10 shows an example of discovering managed systems in accordance with one or more embodiments of the invention. The example is not intended to limit the scope of the invention. In the example shown, the systems management object (1002) discovers managed system A (1012), managed system B (1014), managed system C (1016), and managed system D (1018).

As shown in FIG. 10, the systems management object (1002) includes an identification layer (1004) and a set of drivers (1012). As described above, the identification layer (1004) includes a neural network (1006), a systems identification module (1008), and a drivers taxonomy (1010). The drivers taxonomy (1010) provides a mapping between managed systems classifications and drivers.

In one embodiment of the invention, the drivers taxonomy (1010) may be a multikey-value taxonomy. For example, the drivers taxonomy (1010) may map managed system classifications to specific drivers (or sets of drivers). Alternatively (or in addition to), the drivers taxonomy (1010) may include mappings of network protocol responses to drivers. For example, a ServiceTagID for managed system may maps directly to a driver, a IPMI propername and version may map to a driver, an SNMP model and version may map to a driver, an ICMP ping return sequence (which includes millisecond timings) may map to a driver. Those skilled in the art will appreciate that multiple managed system classifications and/or network protocol responses may be mapped to the same driver.

The following are examples of a driver taxonomy in accordance with one or more embodiments of the invention. The examples are not intended to limit the scope of the invention.

Turning to the examples, the network reconfiguration drivers may be mapped on a per-operating system basis. For example, the driver taxonomy may include a generic network configuration object: OperatingSystem.NetworkConfig, which is associated with a number of operating system specific driver. The selection of the appropriate driver is based on the operating system on which the agent is located or with which the proxy is interacting. For example, if the managed system is running Microsoft® Windows® then the driver maybe windowsDriver.reconfigureNetwork. Similarly, if the managed system is executing Red Hat® Linux®, then the driver may be RedHatLinux.reconfigureNetwork. Microsoft and Windows are trademarks of the Microsoft Corporation. Red Hat is a trademark of Red Hat, Inc. Linux is a registered trademark on Linus Torvalds.

In another example, the driver taxonomy may include an entry which defines a driver to obtain a physical parameter for a managed system, such as Fan Speed. In this example, the driver taxonomy includes an iLOMDriver (which iLOM is a type of service processor on x64 systems) which may be called using iLOMDriver.getFanSpeeds.

Returning to FIG. 10, the systems identification module (1008) includes functionality to use the neural network (1006) and the drivers taxonomy (1010) to identify managed systems and subsequently obtain management information from the managed systems.

The systems management object (1002) may receive a request to discover managed systems within a given range of IP addresses. In the example shown, managed systems are in the range IP Address A-IP Address D (1014A-1014D). According to one or more embodiments of the invention, the range of IP addresses to discover may be provided to the systems management object by a user. Those skilled in the art will appreciate that the IP address range may be specified in any manner without departing from the invention.

First, an identification request is sent to the managed systems in the network (1014A, 1014B, 1014C, 1014D) from the systems management object. It is important to note that the systems management object may be a proxy management object or a satellite management object. Upon receipt of the request, managed system B (1014B) and managed system D (1014D) will respond to the systems management object (1002) with their identification. The identifications sent back to the systems management object includes the classification for each of the managed systems. At this time, managed system A (1014A) and managed system C (1014C) will not respond, as they do not have an identification stored.

Because managed system A (1014A) and managed system C (1014C) have not provided an identification, further interrogation of these managed systems is necessary. The systems management object then sends one or more network protocol requests (e.g., ServiceTag protocol requests, Secured Shell (SSH) requests, Management Information Base (MIB) requests, Intelligent Platform Management Interface (IPMI) protocol requests, simple network management protocol (SNPM) requests, Internet Control Message Protocol (ICMP) ping sequence, etc.) as described in FIG. 8

When the systems management object (1002) receives responses to the protocol requests from managed system A (1014A) and managed system C (1014C), it may classify these management objects. Specifically, the systems identification module (1008) consults the neural network (1006) to identify the type of managed system based on the responses. According to one or more embodiments of the invention, the neural network may add mappings between protocol responses and classifications as it identifies further matches between protocol responses and classifications.

After the managed systems have been classified, the systems management object identifies drivers that may be used to communicate and manage each of the managed systems. The systems identification module (1008) identifies the classification of each of the managed systems (1014A, 1014B, 1014C, 1014D) and determines a set of potential drivers from the set of drivers (1012) using the drivers taxonomy (1010) stored in the identification layer (1004).

Once a set of drivers (selected from the driver (1012) is identified for each managed system, the systems management object proceeds perform the method in FIG. 9 to determine the correct (or most appropriate driver) and then, using the driver obtains management information about the managed system.

Using the above functionality, managed systems may be discovered throughout a network from various locations. Discovery may take place at multiple levels, such as a proxy management object or a satellite management object. Further, performing discovery at multiple locations on a network allows the management system to be highly scalable and adaptable to network traffic.

Those skilled in the art will appreciate that while embodiments of the invention have been described with respect to a data center, the invention may be implemented on any network topology.

FIG. 11 represents a computer system. Embodiments of the invention may be implemented on virtually any type of computer regardless of the platform being used. For example, as shown in FIG. 11, a computer system (1100) includes one or more processor(s) (1102), associated memory (1104) (e.g., random access memory (RAM), cache memory, flash memory, etc.), a storage device (1106) (e.g., a hard disk, an optical drive such as a compact disk drive or digital video disk (DVD) drive, a flash memory stick, etc.), and numerous other elements and functionalities typical of today's computer). The computer (1100) may also include input means, such as a keyboard (1108), a mouse (1110), or a microphone (not shown). Further, the computer (1100) may include output means, such as a monitor (1112) (e.g., a liquid crystal display (LCD), a plasma display, or cathode ray tube (CRT) monitor). The computer system (1100) may be connected to a network (not shown) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (1100) includes at least the minimal processing, input, and/or output means necessary to practice embodiments of the invention.

Further, those skilled in the art will appreciate that one or more elements of the aforementioned computer system (1100) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A system, comprising:
a first managed system executing in a network, wherein the first managed system comprises a first hardware component and a first software component; and
a proxy management object (PMO) executing in the network, wherein the PMO is configured to:
send, to a first active Internet Protocol (IP) address in the network, a first network protocol request in a first network protocol of a plurality of network protocols, wherein the first active Internet Protocol (IP) address corresponds to the first managed system;
receive, from the first managed system, a first response to the first network protocol request;

classify, using a neural network, the first managed system into a subset of a plurality of managed system classifications based on the first response, identify, from the neural network, a second network protocol for narrowing a classification from the subset of the plurality of managed system classifications, send, to the first active IP, a second network protocol request in the second network protocol of the plurality of network protocols;

receive, from the first managed system, a second response to the second network protocol request;

classify, using the neural network, the first managed system into a first managed system classification in the subset of the plurality of managed system classifications, identify a set of drivers using the first managed system classification, wherein the set of drivers are configured to obtain first management information about the managed system, obtain a first set of drivers, populate a data model with the first management information obtained using at least one of the first set of drivers, and manage the first managed system using the data model.

2. The system of claim 1, further comprising:

a second managed system executing in a network, wherein the second managed system comprises a second hardware component and a second software component, wherein the PMO is further configured to:

classify the second managed system associated with a second active IP address in the network using the plurality of network protocols to obtain a second managed system classification;

identify a second set of drivers using the second managed system classification, wherein the set of drivers are configured to obtain second management information about the managed system;

obtain a second set of drivers;

populate the data model with the second management information obtain using at least one of the second set of drivers; and manage the second managed system using the data model, wherein classifying the first managed system and the second managed system occurs in parallel.

3. The system of claim 2, wherein populating the data model with the first management information obtain using at least one of the first set of drivers and populating the data model with the second management information obtain using at least one of the second set of drivers are performed in parallel.

4. The system of claim 1, wherein populating the data model with the first management information obtain using at least one of the set of drivers, comprises:

identifying a first driver from the first set of drivers;

loading the first driver;

obtaining information about the first managed system using the first driver;

verifying, using the information, that the first driver is the correct driver to obtain the first management information from the first managed system;

obtaining the first management information using the first driver, when the first driver is the correct driver;

identifying a second driver from the first set of drivers using the information, when the first driver is the correct driver; and obtaining the first management information using the second driver, when the first driver is not the correct driver.

5. The system of claim 1, wherein the plurality of network protocols comprises at least one selected from a group consisting of a secure shell (SSH) login request, a simple network management protocol (SNMP) request, an Internet Control Message Protocol (ICMP) request, an Intelligent Platform Management Interface (IPMI) request, a ServiceTag protocol request, a management information base (MIB) request, and a private protocol request.

6. The system of claim 1, further comprising:

a satellite management object (SMO), wherein the SMO comprises the neural network, wherein the neural network comprises a mapping between the plurality of managed system classifications and a plurality of drivers, and wherein the SMO is operatively connected to the PMO.

7. A non-transitory computer readable medium comprising computer readable program code embodied therein for causing a computer system to:

send, to a first active Internet Protocol (IP) address in the network, a first network protocol request in a first network protocol of a plurality of network protocols, wherein the first active Internet Protocol (IP) address corresponds to the first managed system;

receive, from the first managed system, a first response to the first network protocol request;

classify, using a neural network, a first managed system into a subset of a plurality of managed system classifications based on the first response;

identify, from the neural network, a second network protocol for narrowing a classification from the subset of the plurality of managed system classifications, send, to the first active IP, a second network protocol request in the second network protocol of the plurality of network protocols;

receive, from the first managed system, a second response to the second network protocol request;

classify, using the neural network, the first managed system into a first managed system classification in the subset of the plurality of managed system classifications, identify a set of drivers using the first managed system classification, wherein the set of drivers are configured to obtain first management information about the managed system;

obtain a first set of drivers;

populate a data model with the first management information obtain using at least one of the first set of drivers; and manage the first managed system using the data model.

8. The non-transitory computer readable medium of claim 7, further causing the computer system to:

classify a second managed system associated with a second active IP address in the network using the plurality of network protocols to obtain a second managed system classification;

identify a set of drivers using the second managed system classification, wherein the set of drivers are configured to obtain second management information about the managed system;

obtain a second set of drivers;

populate the data model with the second management information obtain using at least one of the second set of drivers; and manage the second managed system using the data model, wherein classifying the first managed system and the second managed system occurs in parallel.

9. The non-transitory computer readable medium of claim 8, wherein populating the data model with the first management information obtain using at least one of the first set of drivers and populating the data model with the second management information obtain using at least one of the second set of drivers are performed in parallel.

* * * * *